United States Patent [19]

Black

[11] Patent Number: 5,451,163

[45] Date of Patent: Sep. 19, 1995

[54] METHOD OF TEACHING READING INCLUDING DISPLAYING ONE OR MORE VISIBLE SYMBOLS IN A TRANSPARENT MEDIUM BETWEEN STUDENT AND TEACHER

[75] Inventor: Joseph R. Black, 8245 Southwestern Blvd., #2049, Dallas, Tex. 75206

[73] Assignee: Joseph R. Black, Dallas, Tex.

[21] Appl. No.: 72,713

[22] Filed: Jun. 7, 1993

Related U.S. Application Data

[62] Division of Ser. No. 692,404, Dec. 18, 1990, abandoned.

[51] Int. Cl.⁶ .............................................. G09B 17/00
[52] U.S. Cl. ..................... 434/178; 434/167; 434/307 R; 434/308
[58] Field of Search ............... 434/156, 168, 178, 184, 434/331, 371, 157, 167, 307, 308; D6/300

[56] References Cited

U.S. PATENT DOCUMENTS

| | | | |
|---|---|---|---|
| D. 181,150 | 10/1957 | Horn | D6/300 |
| 2,533,010 | 12/1950 | Henabery . | |
| 3,029,683 | 4/1962 | Zaromb | 88/16.2 |
| 3,122,684 | 2/1964 | Genin | 434/168 |
| 3,369,308 | 2/1968 | Curran . | |
| 3,562,923 | 2/1971 | Chuy et al. | 434/331 |
| 4,123,853 | 11/1978 | Dickensheet | 434/184 |
| 4,190,960 | 3/1980 | Warner | 33/1 |
| 4,397,635 | 8/1983 | Samuels | 434/178 |
| 4,460,342 | 7/1984 | Mills | 434/185 |
| 4,636,173 | 1/1987 | Mossman | 434/178 |
| 4,650,423 | 3/1987 | Sprague et al. | 434/156 |
| 4,884,972 | 12/1989 | Gasper | 434/185 |
| 4,969,271 | 11/1990 | Sump | 33/1 |
| 5,114,346 | 5/1992 | Fioramonti | 434/184 |
| 5,169,316 | 12/1992 | Lorman et al. | 434/185 |

FOREIGN PATENT DOCUMENTS 372725  10/1929  United Kingdom .

OTHER PUBLICATIONS

"Alien Property Custodian", Vignal, Serial No. 386,191, published Apr. 27, 1943.

Primary Examiner—Gene Mancene
Assistant Examiner—Jeffrey A. Smith
Attorney, Agent, or Firm—Vinson & Elkins

[57] ABSTRACT

A method of teaching reading is provided in which symbols to be read are presented to the student. A mirror image of a reader reading the symbols is presented to aid the student's understanding of visible reading correlations. The method may be presented using electronic devices, such as a video tape recorder and a monitor, or using a "transparent flash card" in which a piece of transparent material has a display of symbols to be read and an area for viewing the reader and teacher.

10 Claims, 3 Drawing Sheets

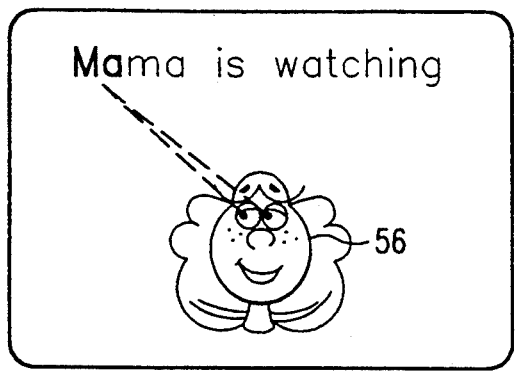
FIG. 5a
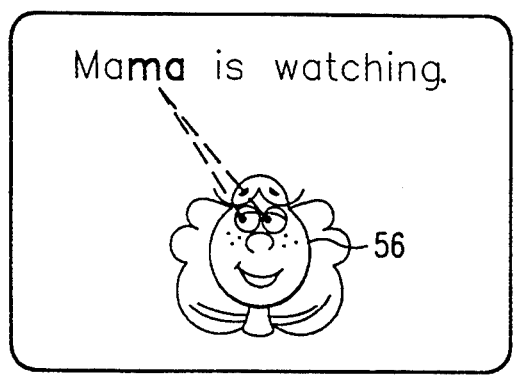
FIG. 5b
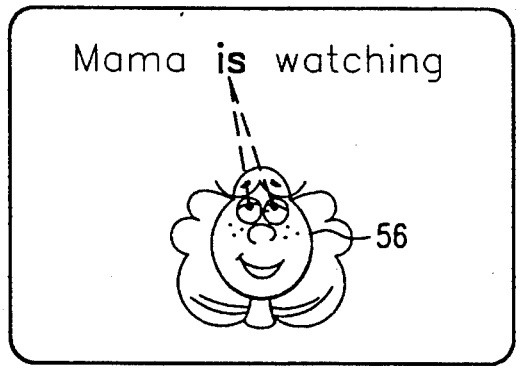
FIG. 5c
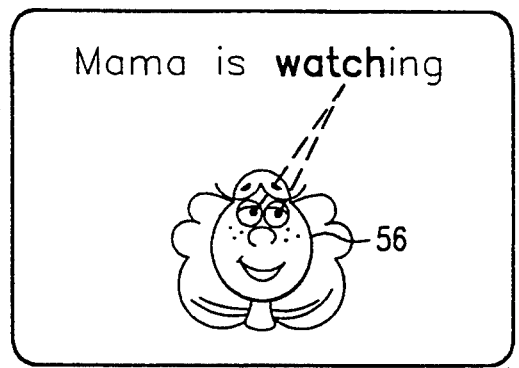
FIG. 5d
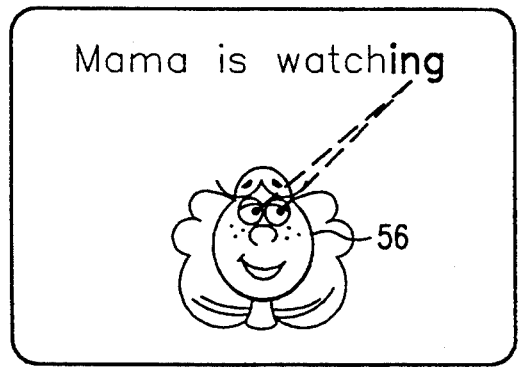
FIG. 5e
FIG. 6
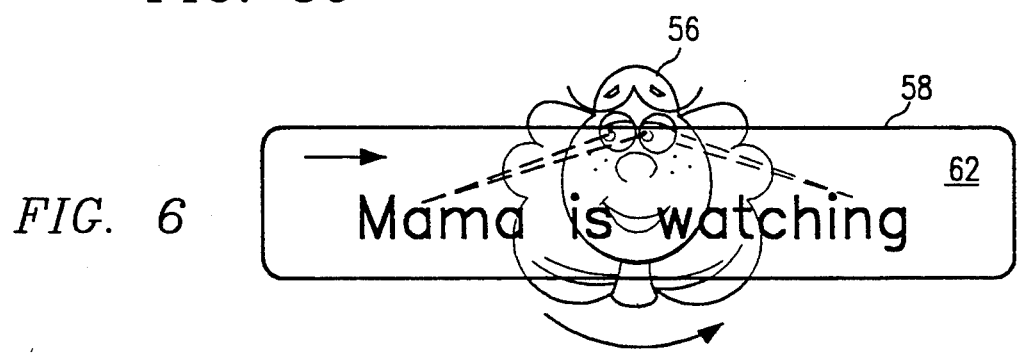

METHOD OF TEACHING READING INCLUDING DISPLAYING ONE OR MORE VISIBLE SYMBOLS IN A TRANSPARENT MEDIUM BETWEEN STUDENT AND TEACHER

RELATED APPLICATIONS

This application is a Divisional of application Ser. No. 07/629,404, filed Dec. 18, 1990, and entitled "AUDIO-VISUAL LANGUAGE INSTRUCTOR"(abandoned).

NOTICE: (C) COPYRIGHT A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

1. TECHNICAL FIELD OF THE INVENTION

This invention relates in general to education, and more particularly to a method and apparatus for teaching reading.

2. BACKGROUND OF THE INVENTION

The use of a video medium to aid the instruction of language has been used for many years. The video medium offers several advantages over personal teaching within the classroom. Production costs which would be prohibitive if used for a single lesson can be absorbed by a large number of homes and classrooms. Also, electronic video systems provide the ability to repeat programs as often as necessary to aid the development of slow learners.

"Sesame Street", a Public Television series, was an early developer in the field of video reading. By relating words to pictures, Sesame Street is able to teach language while maintaining the child's interest.

U.S. Pat. No. 4,636,173 to Mossman improves on the Sesame Street concept of teaching reading. The Mossman Patent describes a method whereby words and syllables are highlighted on the screen to enhance the student's learning.

However, both Sesame Street and the Mossman Patent do not maximize the potential of the video medium in teaching language. Reading phonics requires the interrelation of three separate areas: written words, human brain and face. Within these areas, three actions must occur in the correct sequence for a person to learn to read aloud accurately. First, the person must recognize the beginning of the words or phrase and the proper direction of reading. Second, the person must understand the proper pronunciation of the phonograms comprising the words or phrases. Third, the person must be able to pronounce the correct sounds.

Parts of all reading actions take place in the brain, and cannot be observed. In addition to this abstraction, reading phonics requires a complicated artificial division and restructuring of words. This involves, in the English language, about one hundred phonemes in thousands of combinations.

In the past, a teacher has not been able to show a student all visible reading correlations in the same format and instant. This makes it particularly hard for a student, particularly a learning-impaired student, to learn reading.

Therefore, a need exists in the industry for a method which provides the student with an understanding of the reading and pronouncing of a language.

SUMMARY OF THE INVENTION

In accordance with the present invention, a method and apparatus for teaching reading is provided which substantially eliminates the problems associated with prior methods and devices.

In the present invention, reading is taught by presenting the symbols to be read and presenting the mirror-image of a reader reading the symbols to aid the student's understanding of visible reading and speaking correlations.

Presenting the visual images of the beginning point, direction, eye, neck and mouth movement, with and without sound, enhances the learning experience of the student.

In another aspect of the present invention, the symbols are provided on "transparent flash cards" which comprise a piece of transparent material displaying one or more symbols, through which a teacher and student may view each other. By using the transparent flash cards, reading may be taught without the need for audio-visual equipment.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5a–e illustrates a method of teaching reading by showing a mirror-image of a reader reading one or more symbols; and FIG. 6 illustrates a transparent flash card for use in teaching reading.

DETAILED DESCRIPTION OF THE INVENTION

Figure 1:
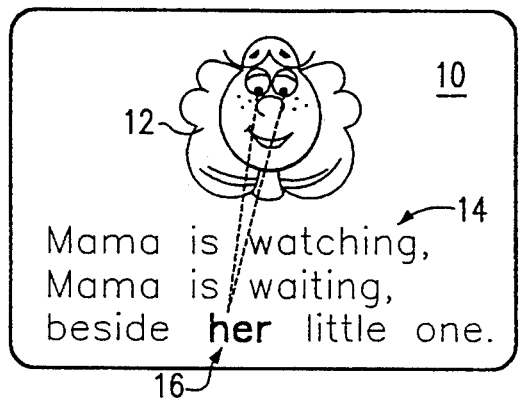
FIG. 1 illustrates a display screen on which a leader introduces the sample of the language.

The preferred embodiment of the present invention and its advantages are best understood by referring to FIGS. 1–6 of the drawings, like numerals being used for like and corresponding parts of the various drawings.

The present invention teaches students to read, produce and write a language by introducing the students to a sample of the language and instructing them in the mechanics of pronouncing and writing the symbols of the language using an audio-visual medium, such as video tape, to introduce the sample.

A main purpose of the invention is to teach students a language. For purposes of the present application, "language" can be construed to include all foreign and native languages, mathematics and vocal music.

The symbols of a language are the notation which translate into sounds and concepts. In languages such as English, the symbols comprise characters (A–Z) and phonemes of more than one character (such as "ch"). In mathematics, the symbols would comprise the characters describing the number system, and the mathematic operators. In music, staffs, words, notes, and other directional notation would comprise the set of symbols.

In the illustrated embodiment, the method of the present invention will be described in conjunction with teaching young children (kindergarten to 2nd grade) English language skills. The method will be described in conjunction with a video tape player displaying the lesson via television; however, the method applies equally as well to other audio-visual media, including film, video disk, broadcast television, computers and other systems.

In a first portion of the lesson, the students are introduced to the sample. Typically, for younger children, the sample will comprise a short song, in which the majority of words have meanings already understood by the subject children. The song may include several stanzas of two to three lines. For illustrative purposes, the following song is used:

"Mama is watching,
Mama is waiting,
Beside her little one.
Mama will be here,
Happy to greet you,
When in the morning comes.
Sleep, sleep,
Sleep and dream,
Rest in Mother's love.
Sleep, sleep,
Sleep and dream,
And God will watch down from above."
Copyright 1987 Joseph R. Black The sample is recited, or sung, by a "leader" on the video. A portion of the screen is dedicated to displaying the sample language, or part thereof. As the sample is recited, the syllables and words are emphasized, as described in U.S. Pat. No. 4,636,173 to Mossman.

As used in this specification:

"emphasize" may mean color, isolate, highlight, enlarge, underscore, flash or other denotations;

"sounding" and "sounded" may mean pronouncing, aurally producing, and aurally produced;

"symbol" may mean character, or combination of characters or notation; and

"unit" may mean symbol, syllable, word, phrase, musical phrase or sentence.

Preferably, for younger children, highlighting comprises using a yellow color on the symbols.

The presence of the leader has two main purposes. First, it is useful to illustrate the oral formations of the sounds of the symbols used in the sample. By viewing the leader, the students can better grasp the mechanics of forming the sounds. Second, the leader may be chosen as a person of approximately the same age as the students, thereby encouraging and challenging the students to attain the learning level of the leader.

FIG. 1 illustrates a sample display used in conjunction with the first portion of the lesson. The screen 10 displays a leader 12 who is reciting the sample 14, a portion of which is displayed on the screen 10. The recitation of the sample 14 is substantially synchronized with the highlighted portion 16.

After the sample has been recited by the leader 12, the sample is once again displayed on the screen, preferably without accompanying pronunciation.

The second part of the lesson includes the introduction of the "alphabet song." Many students will be familiar with the standard "A-be-cee" or "ABC" version of the song. However, prior to reciting the "ABC" version of the song, an "A-bu-cuh" or "Abucuh" version is introduced, which presents the phonetic recitations of the characters comprising the alphabet. The song is sung to the same tune as the standard "ABC" version, but uses the phonetic recitation of each letter.

Typically, the short pronunciation of the vowels and the predominant pronunciation of the consonants are used in the "Abucuh Song", except where the dominant pronunciation of another consonant. For example, the hard "g" pronunciation is used, since the soft "g" version will be pronounced in connection with the letter "j".

The "Abucuh Song" is performed by a leader (or leaders) and the letters are highlighted as they are pronounced. After recitation of the "Abucuh Song", the standard "ABC Song" is sung.

Following the recitation of the "ABC Song", the "Abucuh Song" is reintroduced, preferably repeating portions of the song comprising short groups of characters twice or more before proceeding with the next group of characters. The repeating of small groups of characters reinforces the sounds and symbols in the mind of the students. Thereafter, the song is sung in its entirety, and the students are encouraged to sing along.

Figure 3A:
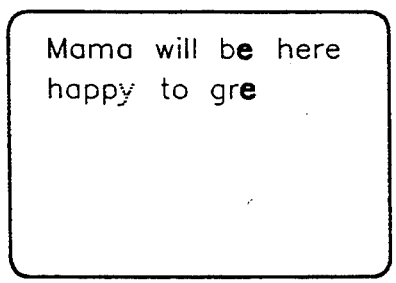
FIGS. 3a–b illustrate the flashback highlighting of identically pronounced symbols, syllables and words.
Figure 3B:
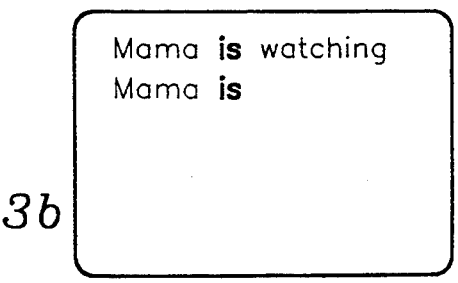
Figure 4:
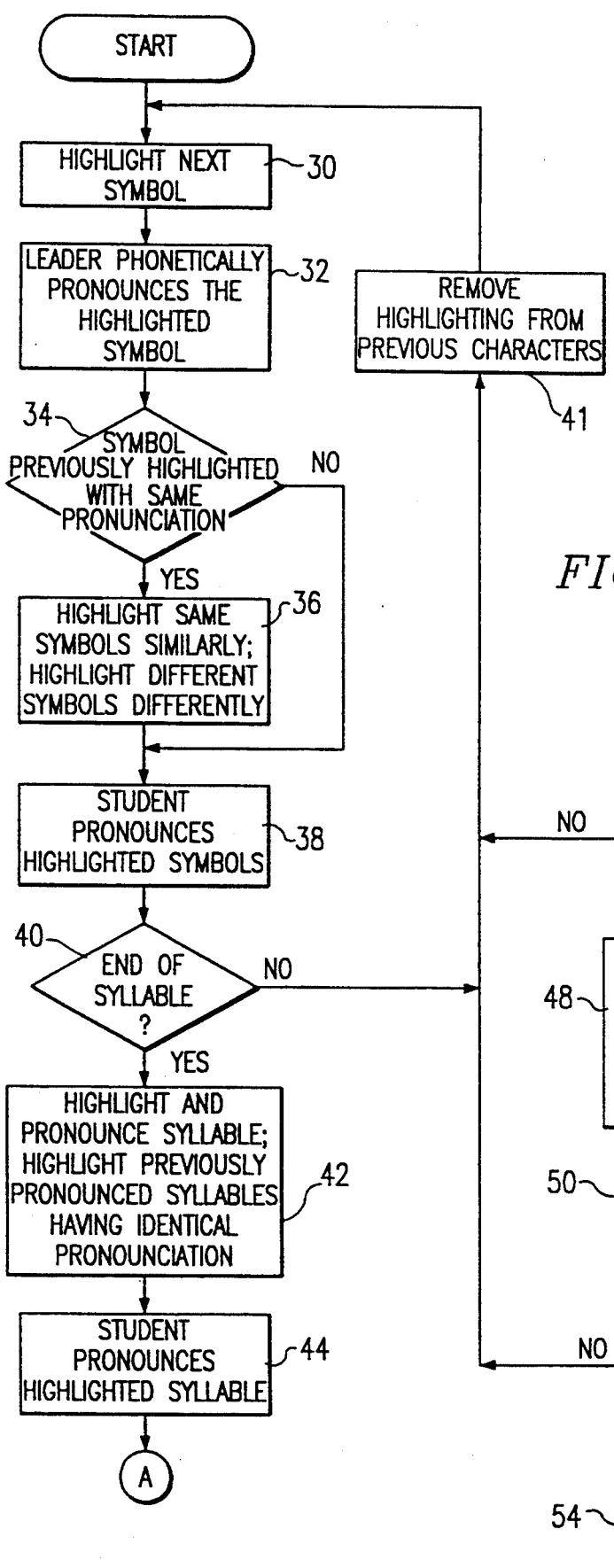
FIG. 4 illustrates a flow chart of the sequential emphasis method.

FIGS. 2-4 illustrate an embodiment of a third portion of the lesson wherein the students are taught the phonetic pronunciation of the sample using highlighting for emphasis. FIGS. 2a-f illustrate the mechanism by which symbols are introduced to the student. In FIG. 2a, the symbol "w" is being introduced (FIG. 2a assumes that "Mama is" has already been introduced), and is highlighted. The highlighted "w" is viewed and phonetically pronounced by the leader. After the leader pronounces the symbol, the students are given time in which repeat the pronunciation. The leader may or may not be shown on the screen at this time.

Figure 2A:
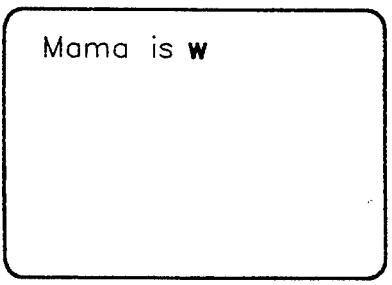
FIGS. 2a–e illustrate screens depicting the sequential introduction and emphasis of the symbols comprising the sample.
Figure 2B:
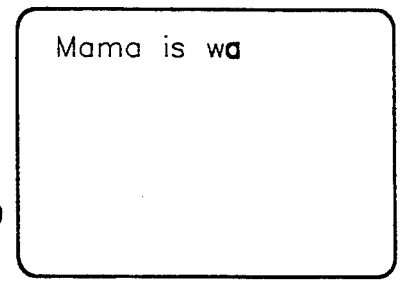
Figure 2C:
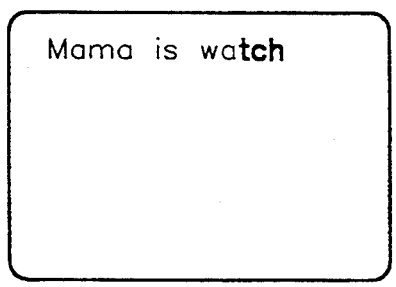
Figure 2D:
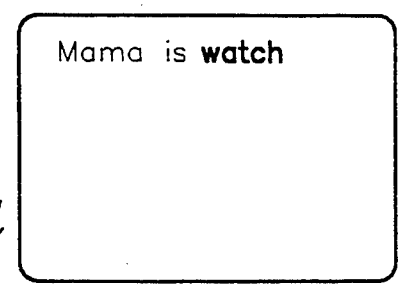

In FIG. 2b, the next symbol, an "a", is highlighted and introduced, and highlighting is removed from the "w". The symbol "a" is viewed and phonetically pronounced by the leader, as it will be pronounced in the word. The students are again given time to repeat the pronunciation of the same symbol. In FIG. 2c, the phoneme "tch" is introduced, and viewed and pronounced by the leader. In this case, the "t", "c" and "h" are introduced and highlighted simultaneously, because of the sound of the "tch" combination. Again, the students are given time to pronounce the symbol "tch" after pronunciation by the leader.

Figure 2E:
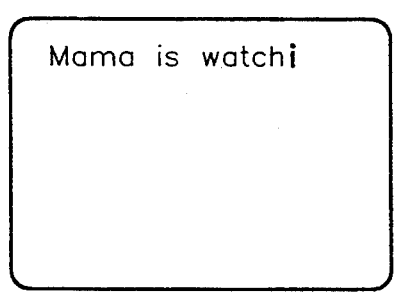

After pronunciation of the symbol "tch", the first syllable of "watching" is complete; therefore, the entire syllable "watch" is highlighted, viewed and pronounced by the leader in FIG. 2c. The students are given an opportunity to repeat the pronunciation of the full syllable. In FIG. 2e, sequential introduction of the characters continues, with the symbol "i". After the phoneme "ng" has been introduced, highlighted, viewed and pronounced, the second syllable "ing" is highlighted, viewed and pronounced by the leader.

After pronunciation by the students, the entire word "watching" is highlighted, viewed and pronounced by the leader. The students are then given an opportunity to pronounce the entire word.

FIGS. 3a-b illustrate a "flashback" technique employed in order to aid the students in pronouncing the newly introduced characters, and in enhancing the students' recognition of like sounding symbols. In FIG. 3a, the symbol "e" is being introduced in the word "greet". The phrase "Mama will be here" has already been introduced in this stanza and is available for viewing on the screen. Since the "e" in "be" and the "e" in "greet" are identically pronounced, they are both highlighted.

In the preferred embodiment, identical symbols (both symbols comprise an "e") are highlighted similarly, such as by using the same color to highlight both symbols. The symbol "y" in "happy" is also identically pronounced with the symbol "e" in "greet". Therefore, the "y" is also highlighted.

In the preferred embodiment, the "y" is highlighted differently from "e" since the symbols are different This can be accomplished by providing different highlighted colors for each symbol.

The flashback concept illustrated in FIG. 3a is applicable to syllables and words, as well as symbols. As shown in FIG. 3b, after introduction of the word "is" in the phrase "Mama is waiting", the word "is" in the previous phrase is also highlighted.

In FIGS. 2–3, the characters of the sample are introduced sequentially, and are highlighted as they are introduced. However, a portion of the stanza could be introduced at one time, with any symbols to be pronounced being highlighted sequentially as described above. It is preferred that the letters be sequentially introduced in order to reduce distractions for the students, and teach directionality.

FIG. 4 illustrates a flow chart which describes the process of highlighting and pronouncing the symbols in detail.

In block 30, the symbol to be pronounced is highlighted. In block 32, the leader reads and phonetically pronounces the highlighted symbol. In decision block 34, it is determined whether a symbol having an identical pronunciation to the highlighted symbol has been previously highlighted and pronounced. If so, the previously highlight symbol is highlighted in addition to the current symbol. If the previously highlighted symbol is identical to the current symbol, then both symbols are highlighted in the same color. If the previously highlighted symbol is different than the current symbol, then it is highlighted in a different color. If there are no identically pronounced symbols available, then the highlighting of block 36 is not performed.

In block 38, the students are given an opportunity to pronounce the highlighted symbol. In decision block 40, it is determined whether the end of the syllable has been reached. If not, program flow continues at block 30, after removing the previous highlighting in block 41, and the next symbol is sequentially highlighted.

If a syllable has been formed, the syllable is highlighted, read and pronounced by the leader in block 42. If identically pronounced syllables are available, they are also highlighted in order to aid the students' pronunciation.

In block 44, the student is given the opportunity to pronounce the highlighted syllable.

In decision block 46, it is determined whether an entire word has been completed. If not, the next symbol is highlighted after removing the previous highlighting in block 41. If the end of a word has been reached, the entire word is highlighted, read and pronounced in block 48 (assuming the word is more than one syllable long) and previous identically pronounced words are highlighted for "flashback" reference.

After the leader pronounces the word in block 48, time is allowed in which the students may pronounce the word in block 50.

In decision block 52, if the stanza or sample is complete, then the entire stanza is presented for review by the students in block 54. If the stanza is not complete, then program flow returns to block 38 after removing highlighting from the previous characters in block 41.

While the flow chart of FIG. 4 describes the method of highlighting, reading and phonetically pronouncing characters in detail, it should be noted that the producer of the lesson may tailor the method to suit the needs of the students. For example, almost all students will be familiar with the term "Mama", therefore, on the second instance of "Mama" in the sample, it is probably not necessary to introduce the word symbol by the second "Mama" syllable by syllable, or in one step. This challenges the students to recognize the familiar words and focuses their attention on new material.

Preferably, the phonetic pronunciation portion of the lesson described in connection with FIGS. 2–4 should not exceed seven minutes without a break for the students. Hence, if the sample is very long, it should be broken into several stanzas of three to four lines.

In the illustrated embodiment, the sample is broken into four stanzas. After the phonetic pronunciation of the first stanza, the phonetic alphabet song previously described is recited after the first stanza is taught. After the phonetic alphabet song, the second stanza is taught as described in connection with FIGS. 2–4.

After completing the phonetic pronunciation of the second stanza, a fourth portion of the lesson is employed wherein words are individually presented on the video screen. In the preferred embodiment, the leader is also pictured on the video screen and the words are pronounced by the leader as they are presented. The words need not be placed in the same order as in the sample.

In this portion of the lesson, the words are moved off the screen in a fanciful way in order to attract the eyes of the students. For example, they may be moved upward to disappear off the top of the screen.

It has been found that words moving thus, or otherwise moving on the display, are superior in capturing and holding students' attention. For added effect, the leader's eyes may appear to follow the word. The creation of movements of the words and symbols may be accomplished using a suitable character generator.

After the leader has read and pronounced the words, the words are reintroduced and the students are encouraged to repeat the words after pronunciation by the leader.

Next, the third and fourth stanzas are read and phonetically pronounced as described in connection with FIGS. 2–4.

In the next portion of the lesson, handwriting techniques are taught. The creation of the symbols, as if being produced by hand, is displayed on the video screen, with or without the corresponding sounds of the symbols. The students are encouraged to attempt a recreation of the symbols as shown on the video screen.

If the construction of the audio-visual device safely permits, the students may be allowed to trace the creation of symbols on it, until beginning to draw the symbols on another medium.

FIGS. 5a–e illustrate an important aspect of the invention wherein a mirror-image of a reader is displayed in conjunction with the symbols being read in order to provide the student with an understanding of the visible reading correlations, such as the beginning and direction of reading, eye movement, neck movement and word formation. The "mirror-image" of the reader is the image which would occur if the symbols were written on a mirror and the reader reading the symbols. Thus, the reader's face is viewable by the student during reading, while the reader's eyes, neck and head follow the words in the same direction of the student's. The mirror-image can be generated on videotape by filming the reader while the reader "reads" backwards (i.e., from right to left). The symbols can be superimposed on the videotape using readily available commercial equipment.

In FIG. 5a, the reader 56 is shown with his head and eyes oriented toward the beginning of the phrase "Mama is watching." The first syllable, "Ma", is highlighted. This helps orient the students to the beginning of the phrase. In FIGS. 5b-d, the reader's head, eyes and neck, move synchronously with the reading of the sentence. As each word is read, the appropriate syllables are highlighted. While FIGS. 5a-e illustrate reading on a syllable-by-syllable basis, the reader may also read the phrase on a letter, phoneme or word basis, as outlined previously. By reading the letters aloud, the student's understanding of spelling is enhanced.

In the preferred embodiment, the displayed letters are at least two inches high, which allows for more exaggerated eye, head and neck movements by the reader 56. Further, the large letters help the visually-impaired and children under seven, whose eyes generally are more susceptible to becoming near-sighted trying to read finer print.

The present invention provides important neurological impact to the student. Tests using the present invention have shown that proper neck movement is strong training against dyslexic tendencies. Viewing the mirror-image of the reader 56 impacts strongly on the student's brain to teach the correct reading direction.

The sequence shown in FIGS. 5a-e can also be used with the reader 56 reading silently, for drilling and testing the student, and being used as a diagnostic tool.

The same reenforcing correlations can be applied to teaching printing and cursive writing. Handwriting may be artificially generated on the screen while the letters or phonemes are read by the reader 56. Artificial electronic generation of the letters, without a writing hand in the way of the viewer, guides both left- and right-handed students equally.

In a final portion of the lesson, questions are produced on the video screen accompanied by the visual pronunciation of the question by the leader. The answer to the question is introduced and then highlighted character by character, thereby helping the student to produce the sound of each character. In an alternative embodiment, the questions may be presented in video only, or in audio only.

This portion of the lesson encourages the student to utilize the phonetic sounds he has learned to answer the question. Since the questions are provided in the form of a riddle, the student is eager to gain and use the skills.

After the lesson, the student may be tested by repeating the presentation, or portion thereof, without audio. The student is instructed to produce the sounds of highlighted symbols and groups of symbols. If spelling is being taught, the student may be asked to pronounce the symbol names, and words.

The student may be further tested by repeating a presentation without video, and instructing the student to write the symbols or words being pronounced.

The methods described above work via the neurological impress method. This system simultaneously bombards the student's conscious and unconscious mind with correlating stimuli. This builds a geometric pattern of corresponding memories and images. Because the method is sequential, it teaches against dyslexia tendencies.

The brain is capable of breaking down sounds and actions into sub-sounds and sub-actions (in the case of spoken sounds, sub-phonemes). This helps the student better understand what is being presented to the senses, and how.

Almost every student's ability includes some of these "subs". By receiving unobstructed inputs on two or more correlating levels, using favored emphasis and adding positive emotions provided by good role-modeling and interesting phenomena, the mind is more positively impacted.

As previously noted, the method described above may be used to teach vocal music and mathematics. For music, a voice may be recorded performing scales, followed by pronunciation and illustration of the musical notation and their names, in an order of relative import.

The visual production of sounds may be displayed, with corresponding symbols. The written musical sample is then introduced, accompanied by a reproduction of the sounds, as described in connection with FIGS. 2-4. The lessons on writing would apply to notation. In testing, the student might be asked to sing music displayed on the screen or to repeat a sample of music aurally produced.

Similarly, a mathematical vocabulary may also be taught, by introducing and pronouncing the symbols used to denote numerical representations and operations.

FIG. 6 illustrates a part of the invention which may be used to train students using a mirror-image of a reader without the need for electronic equipment. A transparent flash card 58 comprises a transparent portion 60 and a display portion 62, which provides a plurality of symbols to be read. The transparent portion allows a student to view the reader 56, standing behind the flash card 58, as the words are read. The reader 56 reads the symbols of the display portion 62 in a mirror image sequence. Hence, the reader 56 initially begins with eyes pointed toward the first syllable "Ma" and continues reading the phrase to illustrate the eye, neck and head movements, along with the facial movements of enunciating the word. The display area may consist of a letter, phoneme, phonogram, symbol, syllable, word, phrase or sentence. The display area 62 may be preprinted, or may be an erasable surface as big as a chalkboard. The flash card 58 may be formed using a light-weight plastic material. By using the transparent flash card, a mirror-image of reading may be produced without expensive video equipment.

A directional device, such as a pointing arrow or happy face, with eyes looking right may be affixed at the correct beginning point or the symbols on the transparent flash card, in order to show beginning point and directionality. Position and direction of these devices may be adjusted for varying languages.

Although the present invention and its advantages have been described in detail, it should be understood that various changes, substitutions and alterations can be made herein without departing from the spirit and scope of the invention as defined by the appended claims.

What is claimed is:

1. A method of teaching reading comprising the steps of:

displaying one or more visible symbols in a transparent medium interposed between a student and a teacher;

reading the symbols orally, such that the student can see corresponding mouth movements of the teacher through the transparent medium; and showing corresponding eye movements of the teacher to the student through the transparent medium as the symbols are pronounced.

2. The method of claims 1 wherein said step of displaying one or more symbols on a transparent medium comprises the step of displaying one or more letters on a transparent medium.

3. The method of claim 1 wherein said step of displaying one or more symbols on a transparent medium comprises the step of displaying one or more phonemes on a transparent medium.

4. The method of claim 1 wherein said step of displaying one or more symbols on a transparent medium comprises the step of displaying one or more words on a transparent medium.

5. The method of claim 1 wherein said step of displaying one or more symbols on a transparent medium comprises the step of displaying one or more phrases on a transparent medium.

6. The method of claim 1 wherein said step of displaying one or more symbols on a transparent medium comprises the step of displaying one or more sentences on a transparent medium.

7. The method of claim 1 wherein said step of displaying one or more symbols on a transparent medium comprises the step of displaying one or more mathematical notations on a transparent medium.

8. The method of claim 1 wherein said step of displaying one or more symbols on a transparent medium comprises the step of displaying one or more music notations on a transparent medium.

9. The method of claim 1 and further comprising the step of showing corresponding neck movement of the teacher to the student through the transparent medium to the student.

10. The method of claim 1 and further comprising the step of showing corresponding head movement of the teacher to the student through the transparent medium to the student.

* * * * *